(12) United States Patent
Squibbs (10) Patent No.: US 6,662,137 B2
(45) Date of Patent: Dec. 9, 2003

(54) DEVICE LOCATION DISCOVERY BY SOUND

(75) Inventor: Robert Francis Squibbs, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 10/017,226

(22) Filed: Dec. 11, 2001

(65) Prior Publication Data

US 2002/0077772 A1 Jun. 20, 2002

(30) Foreign Application Priority Data

Dec. 19, 2000 (GB) .............................................. 0030918
Mar. 24, 2001 (GB) .............................................. 0107445

(51) Int. Cl.⁷ .............................................. G01B 21/00
(52) U.S. Cl. ........................ 702/159; 702/150; 702/158
(58) Field of Search ................................ 702/150, 152, 702/155, 158, 159, 189; 340/825.49, 825.5, 825.36, 825.54; 367/6, 117, 120; 704/275, 270, 231

(56) References Cited

U.S. PATENT DOCUMENTS

| | | | |
|---|---|---|---|
| 5,043,950 A | * | 8/1991 | Schorum et al. .............. 367/98 |
| 5,465,302 A | | 11/1995 | Lazzari et al. ................. 381/92 |
| 5,504,477 A | | 4/1996 | Whitright et al. ......... 340/825.5 |
| 5,940,346 A | | 8/1999 | Sadowsky et al. ........... 367/128 |
| 5,991,726 A | * | 11/1999 | Immarco et al. ............. 704/270 |
| 6,009,396 A | | 12/1999 | Nagata ......................... 704/270 |
| 6,054,950 A | * | 4/2000 | Fontana ....................... 342/463 |
| 6,219,645 B1 | | 4/2001 | Byers .......................... 704/275 |

FOREIGN PATENT DOCUMENTS

| | | |
|---|---|---|
| EP | 0 485 879 A1 | 5/1992 |
| EP | 0 585 101 A2 | 3/1994 |
| EP | 0 653 701 A1 | 5/1995 |
| GB | 1 566 616 | 5/1980 |
| WO | 96/41214 | 12/1996 |
| WO | 00/02388 | 1/2000 |

* cited by examiner

Primary Examiner—Bryan Bui (57) ABSTRACT

Each device of a group of devices, in particular voice-controlled devices, is equipped with sound receivers and emitters and a short-range radio communication subsystem. Each device is caused to emit a test sound and, via its communications subsystem, a related timing-reference signal. Each device receiving a test sound and related timing-reference signal determines the transit time of the test sound. Using the measured transit times, the devices determine their distances one from another and, by exchanging these distances, the devices, or at least one of them, calculates the relative locations of all devices.

43 Claims, 7 Drawing Sheets

DEVICE LOCATION DISCOVERY BY SOUND

FIELD OF INVENTION

The present invention relates to the discovery by a collection of devices of their relative locations using sound.

BACKGROUND OF THE INVENTION

Voice control of apparatus is becoming more common and there are now well developed technologies for speech recognition particularly in contexts that only require small vocabularies.

However, a problem exists where there are multiple voice-controlled devices in close proximity since their vocabularies are likely to overlap giving rise to the possibility of several different devices responding to the same voice command. In fact, the problem is more general and arises wherever there are multiple devices in close proximity whose input or output overlap.

One approach to effecting selective device activation amongst a group of devices is to ascertain the position of the user relative to the devices, and thus determine to which device the user is closest. This method relies on a knowledge of the device locations.

Whilst it is, of course, possible for an installer to measure the position of each device with respect to some external reference and input the measured device positions into a device activation control system, this approach does not lend itself to a situation where the devices may be frequently moved and devices added or removed from the device group. Even equipping each device with a system such as GPS for determining its own absolute location is not satisfactory because reception and location accuracy using GPS inside a building is often unreliable and unlikely to give the necessary location resolution required between member devices a group of devices situated in the same room.

Furthermore, device location discovery will generally be provided as an auxiliary device function rather than as the main device function, and it is therefore preferable, for cost reasons, that location discovery be done using device features already required for the main device function.

Accordingly, it is an object of the present invention to provide a way of enabling devices to discover their relative locations which is easy to deploy and, preferably, can utilise device features already present for other purposes.

SUMMARY OF THE INVENTION

According to a first aspect of the present invention, there is provided a location discovery method for a plurality of devices equipped with respective electromagnetic communication subsystems, sound emitters and sound receivers; the method comprising the steps of:
  a) emitting from each device both a test sound and, via its communications subsystem, a timing-reference signal;
  b) receiving the test sound and timing-reference signal emitted by each device at at least two other said devices and determining respective measures of the transit times of the test sound between emitting and receiving devices, the timing-reference signal enabling the timing of emission of the test sound to be related to the timing of its receipt; and
  c) using the transit-time measures to determine the relative locations of the devices. The transit-time measure can, for example, be the transit time itself or, indeed, a derivative measure such as the distance between the emitting and receiving devices.

According to a second aspect of the present invention, there is provided an auto-location method for a plurality of voice-controlled devices equipped with respective microphones and electric or electromagnetic communication means, wherein each device is caused to emit a sound at the same time as sending an electric or electromagnetic signal, the latter acting as a timing point enabling the other devices to determine their distance from the emitting device, the devices exchange their distances from other devices whereby to enable each device to calculate the relative locations of all devices.

According to a third aspect of the present invention, there is provided a device comprising:
  a sound emitter for emitting a test sound;
  a sound receiver for receiving a test sound;
  an electromagnetic communications subsystem for sending and receiving timing-reference signals;
  an emission control arrangement for sending a test sound via the sound emitter and a related timing-reference signal via the communications subsystem;
  a measurement arrangement operative upon the receipt of a test sound and related timing-reference signal from another device to determine a measure of the transit time of that test sound and thereby of the distance between the two devices; and
  a distribution arrangement for sending the determined measure to at least one other device via the communications subsystem.

According to a fourth aspect of the present invention, there is provided a device comprising:
  a sound emitter for emitting a test sound;
  a sound receiver for receiving a test sound;
  an electromagnetic communications subsystem for sending and receiving timing-reference signals;
  an emission control arrangement for sending a test sound via the sound emitter and a related timing-reference signal via the communications subsystem;
  a measurement arrangement operative upon the receipt of a test sound and timing-reference signal from another device to determine a measure of the transit time of that test signal and thereby of the distance between the two devices; and
  a location-determination arrangement for receiving, via said communications subsystem, further measures that have been determined by other devices, and using these further measures and the measure determined by its own measurement arrangement to determine the relative locations of the devices.

According to a fifth aspect of the present invention, there is provided a handheld device comprising:
  a sound emitter for emitting a test sound;
  an electromagnetic communications subsystem for sending and receiving signals;
  an emission control arrangement for sending a test sound via the sound emitter and a related timing-reference signal via the communications subsystem; and
  a location-determination arrangement for receiving, via said communications subsystem, measures of the transit time of the test sound to other devices, and data concerning the locations of those other devices relative to one another, the location-determination arrangement being operative to use the receive measures and data to determine the location of the handheld device.

BRIEF DESCRIPTION OF THE DRAWINGS

Embodiments of the present invention, will now be described, by way of non-limiting example, with reference to the accompanying diagrammatic drawings, in which.

BEST MODE OF CARRYING OUT THE INVENTION

Figure 1:
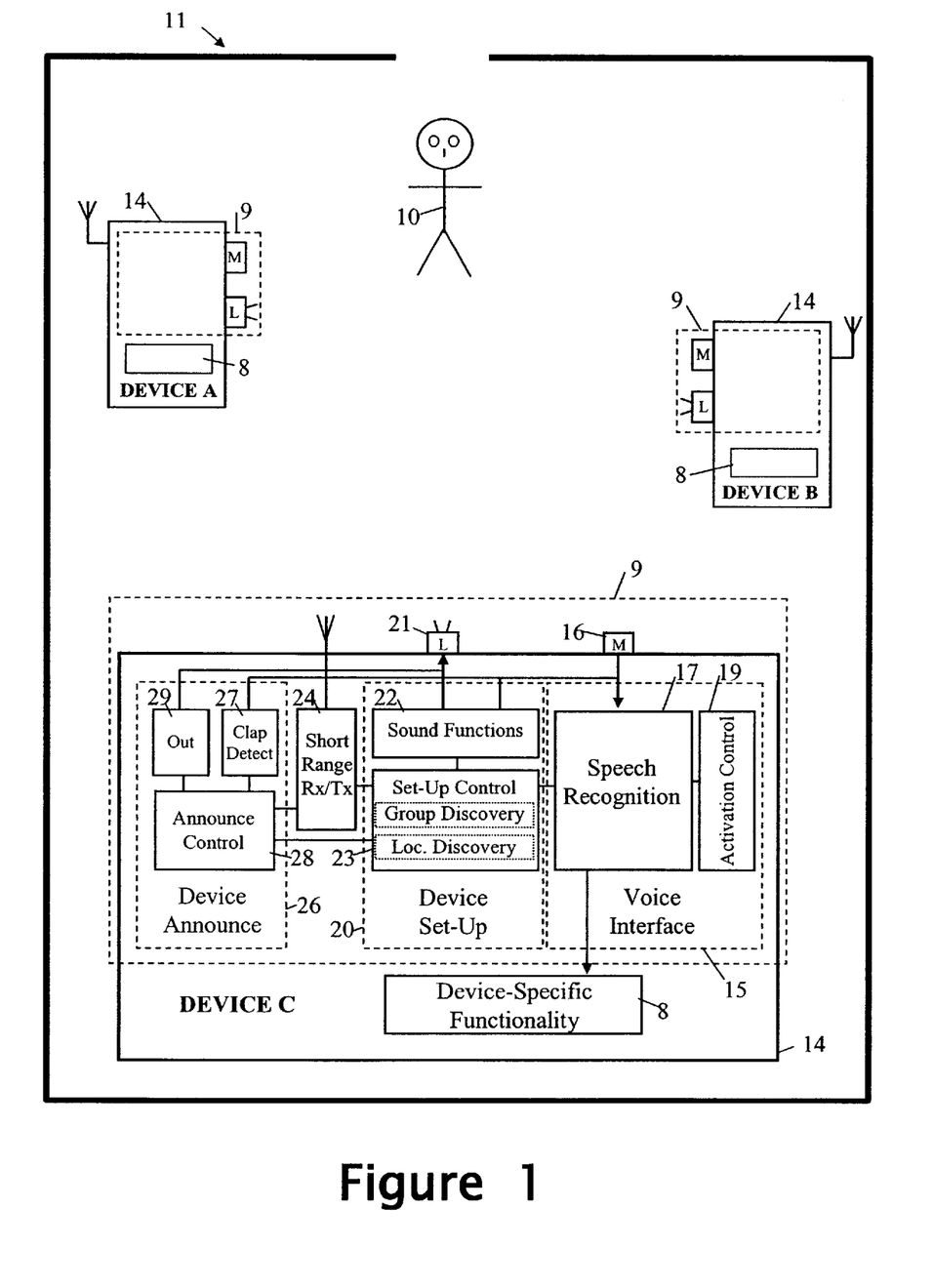
FIG. 1 is a diagram illustrating a room equipped with three voice-controlled devices provided with common functionality embodying the invention.

FIG. 1 shows a work space 11 in which a user 10 is present. Within the space 11 are three voice-controlled devices 14 (hereinafter referred to as devices A, B and C respectively) each with different specific functionality 8 but each provided with a common set 9 of control and interface components. As shown for device C, this common set 9 of control and interface components comprises a microphone 16, a loudspeaker 21, a short-range radio transceiver 24 (such as a Bluetooth transceiver) for inter-device communication, a voice interface subsystem 15, a set-up subsystem 20, and a device announce subsystem 26.

Figure 2:
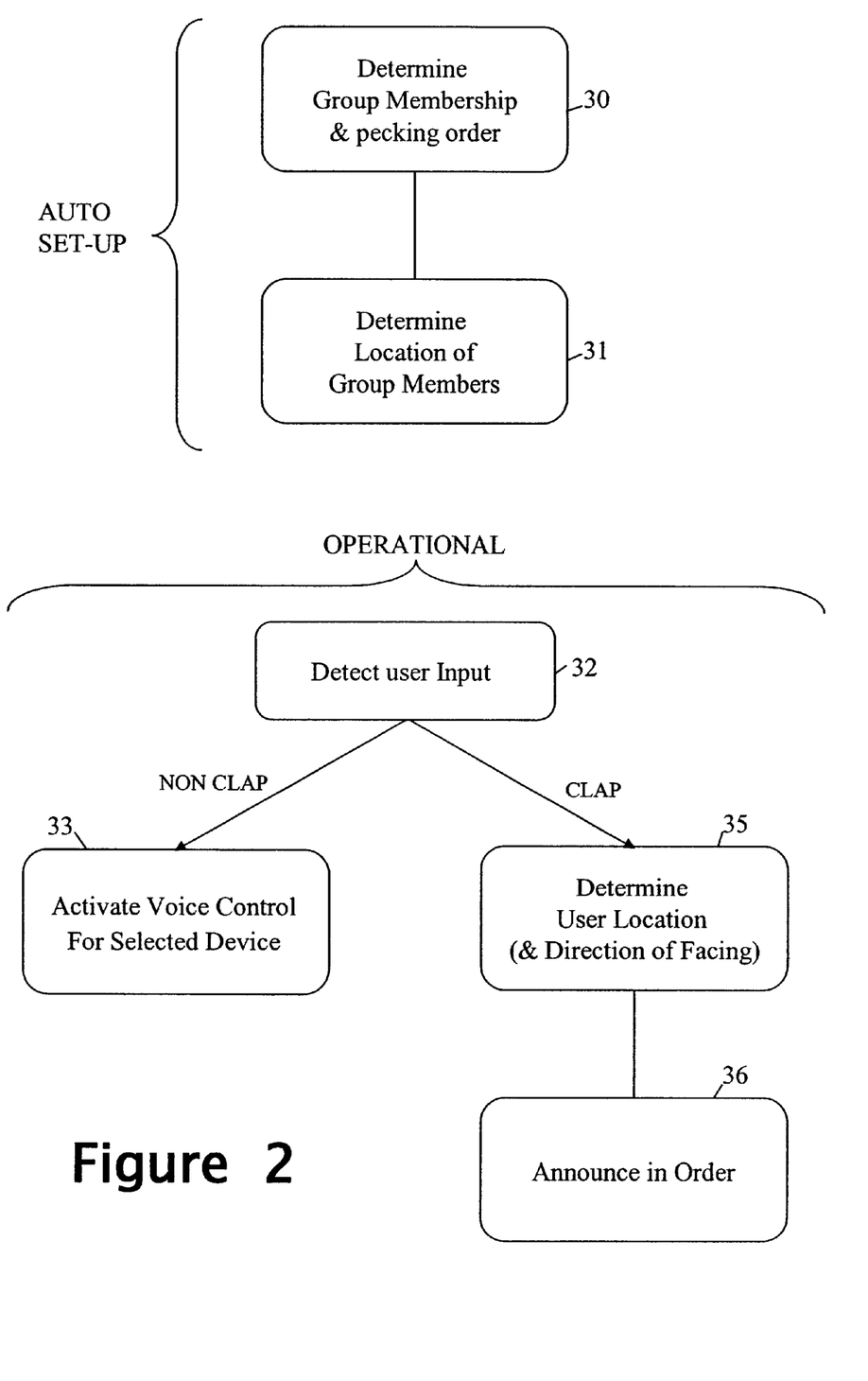
FIG. 2 is a diagram illustrating setup and operational phases of the FIG. 1 devices.

Each device 14 has an automatic set-up phase that proceeds entry into an operational mode—see FIG. 2. The set-up phase involves a first stage 30 of group membership discovery and a second stage 31 of member location discovery. When a device is in its operational mode, audio input is detected (step 32) and if this input is a clap, a device announcement sequence is executed (steps 35, 36); however, if the audio input is verbal and the device concerned has been selected for activation, the verbal input is used to control the device-specific functionality 8 (step 33).

Figure 7:
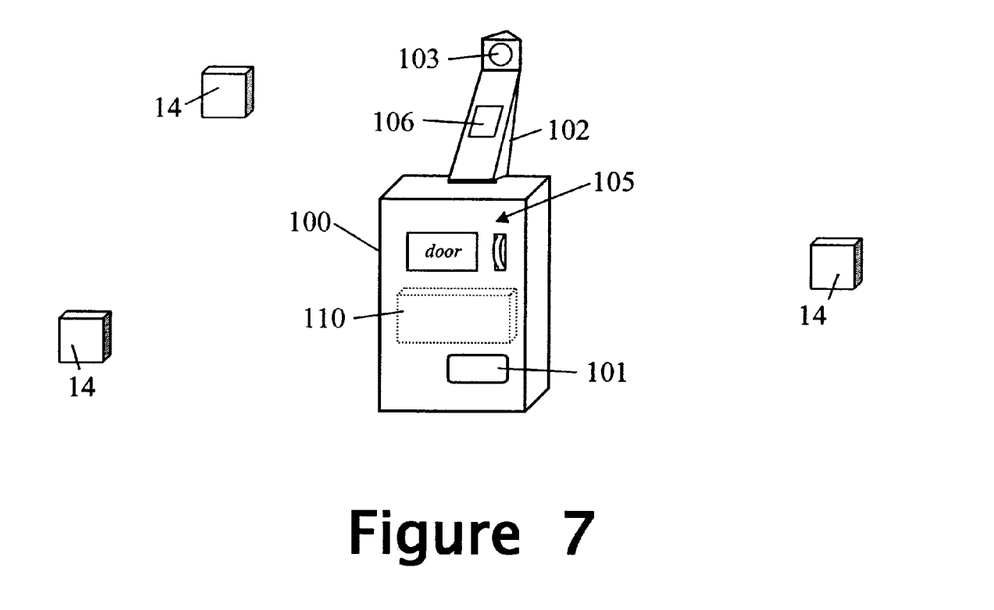
FIG. 7 is a diagram depicting a hand-held feature-mapping device.

The device announcement sequence, which will be more fully described hereinafter with reference to FIGS. 7–9, involves the devices audibly announcing themselves to a user (step 36), the announcing being done in an ordered manner, preferably taking account of the user's location as determined in step 35.

As regards voice control of the device functionality 8, for present purposes it is sufficient to note that this is effected by the voice interface subsystem 15 of the device, this subsystem comprising an activation control block 19 for determining when the device concerned selected for activation, and a speech recognition block 17 for recognising command words in the verbal input and controlling the functionality 8 accordingly. With respect to how device selection, this can be achieved by any suitable technique including user operation of an activation button on the device, or detection of which device the user is facing at the time of speaking the command. Methods for implementing this latter selection technique are described in our co-pending UK Application No. GB 0029571.7 (visual detection of direction of facing) and UK Application No. GB 0030918.7 (audio detection of direction of facing). The specifics of how a particular device is selected are not of importance to the present invention and are therefore not further described herein.

Group Discovery

The group membership discovery step 30 of the device set-up phase will now be described with reference to FIGS. 3 and 4. There are several reasons why it is useful to know about device grouping. Thus, for example, in the above-mentioned methods of device selection using direction-of-facing detection, determination of which device is being selected can be facilitated by knowing what devices are present and their locations. Another example is to enable devices to be ranked so as to order their transmissions (examples of a requirement for ordered transmissions are given below with respect to the device location determination step 31 and to the device announcement process 35, 36).

Group discovery is effected by the device set-up subsystem 20 using the microphone 16, loudspeaker 21 and short-range radio transceiver 24. The parts of subsystem 20 that are relevant to group membership discovery are a sound functions block 22 for emitting sounds via loudspeaker 21 and receiving sound input via microphone 16, and group-discovery control functions of a control block 23.

The discovery process will first be outlined starting from a state where the devices A, B and C know nothing of each other. The control block 23 of each device is operative to cause the sound functions block 22 to emit via loudspeaker 21 a distinctive "mating sound" at random periodic intervals. In coordination with (typically, but not necessarily, at the same time as) the emission of the mating sound, the control block 23 causes the transceiver 24 to emit a mating signal. One device, referred to below as the initiator device, will be the first to emit its mating sound and signal. Each other device within range detects, via its short-range transceiver 24, the mating signal sent by the transceiver of the initiator device and if this signal is complemented by the receipt of the related mating sound detected by microphone 16, then the device responds to the initiator device over the short range transceiver 24; (of course, if the mating sound is sent sufficiently in advance of the mating signal, then the receiving devices receive the mating sound first and seek to match it with a later-received mating signal). The initiator device now determines what devices are within range, these devices, or a selected subset, forming an initial group membership which the initiator device communicates to the member devices.

Each device receiving the mating sound and signal from the initiator device is at least temporarily disabled from sending mating sounds and signals; however to check whether each such device is within range of each other such device, it sends a connectivity-check sound (preferably, but not necessarily, different from the mating sound) and related signal. Information about whether these connectivity-check sound-and-signal pairs are successfully exchanged between all group members is then used by the initiator device to determine a settled group membership either excluding or including (according to a it predetermined policy) devices that can only hear some, but not all, group members.

Using sound proximity to define the group is beneficial as it is less likely to result in the group being spread across different rooms than if the short-range transceivers had been used for this purpose.

Figure 3:
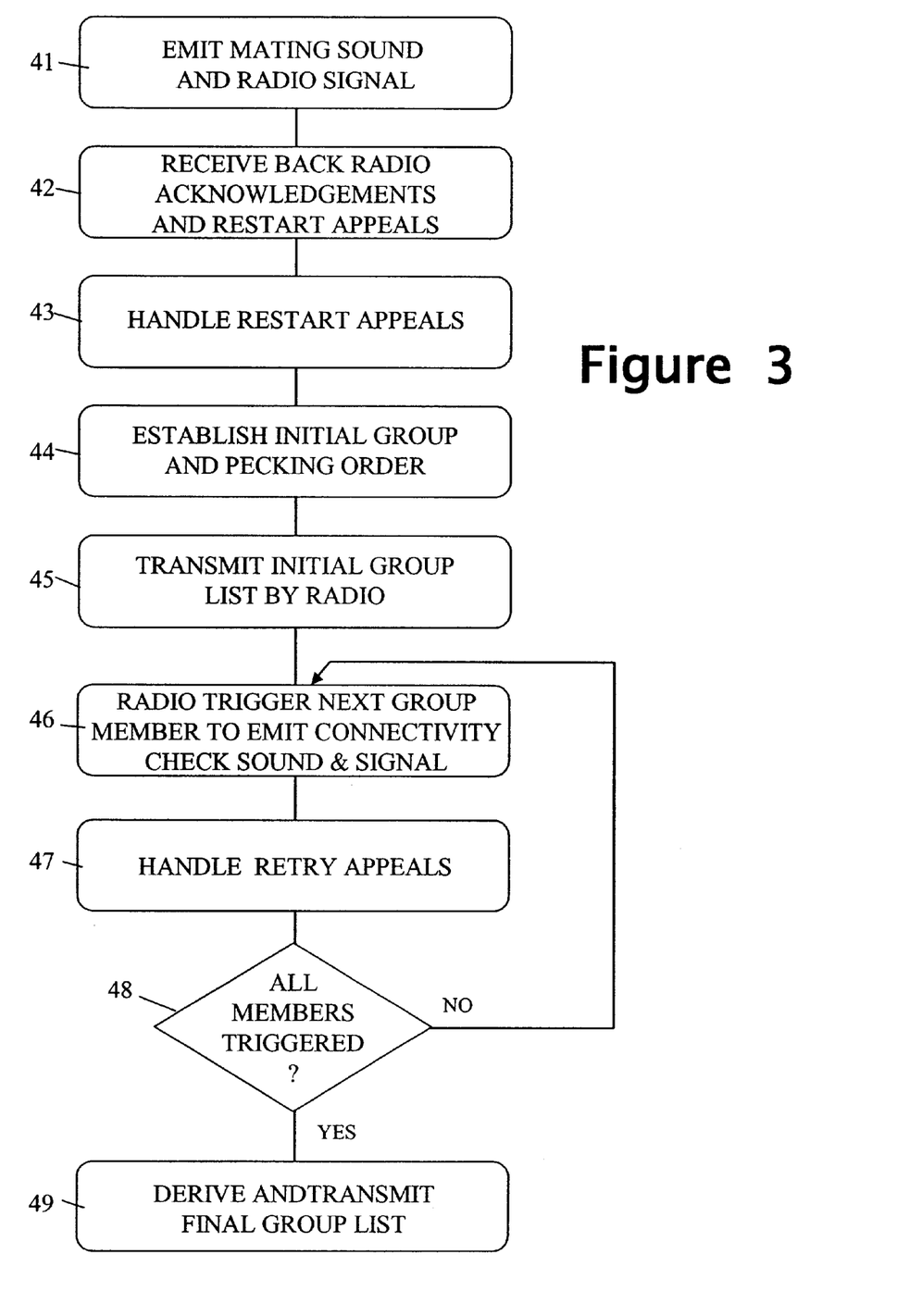
FIG. 3 is a diagram illustrating the steps carried out by an initiator device in initiating and coordinating group discovery by the devices.
Figure 4:
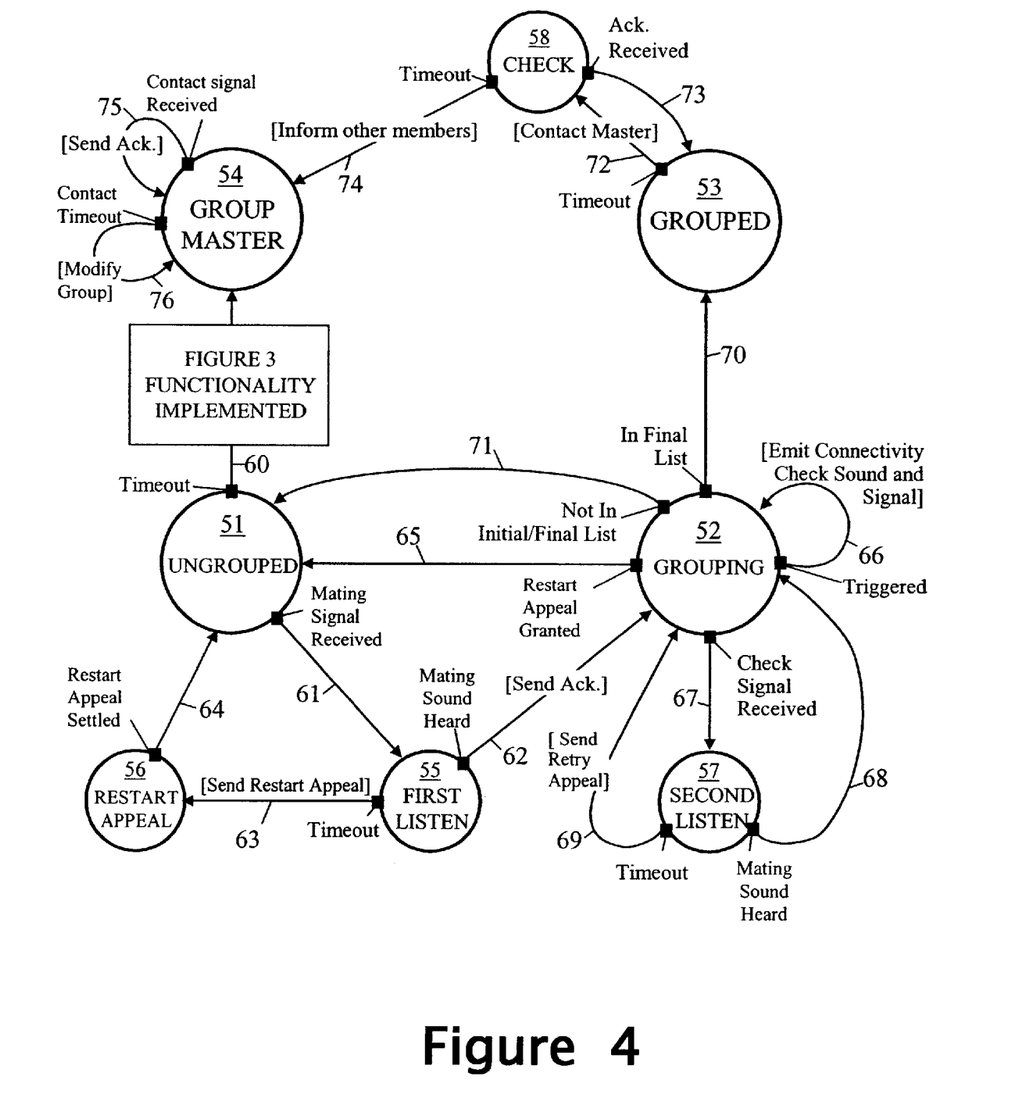
FIG. 4 is a state diagram illustrating the operation of the non-initiator devices during the group discovery process.

A more detailed description of the group discovery process will now be given with reference to FIGS. 3 and 4 where FIG. 3 is flow chart showing the steps executed by the initiator device in effecting group determination and FIG. 4 is a state diagram defining the operation of the other devices as they participate in the group discovery process. The control of the FIG. 3 process and the implementation of the state diagram of FIG. 4 is done by the control block 23 (typically a processor running under program control).

The first step 41 shown in FIG. 3 is the emission by the initiator device of the mating sound and mating signal. Which one of the devices A, B or C takes the role of initiator device is randomly determined by their random timeout periods to first transmission of the mating sound and signal. The mating sound can, for example, be a predetermined sound of a form already known to all devices or a sound having characteristics that are detailed in the mating signal; in this latter case, the characteristics can be varied between emissions.

The mating signal sent by the radio transceiver 24 of the initiator device is preferably sent at the same time as the mating sound is emitted from loudspeaker 17; however, as already indicated, the mating signal can be sent at a different time, either before or after the mating sound, though preferably in a general time relationship to the latter that is known to the other devices to enable them to relate the mating sound and signal and ignore extraneous sounds (note that the time relationship can only be generally specified in view of the significant travel time for the sound signal). Rather than using a general time of transmission to relate the mating sound and signal, the characteristics of the mating sound can be used to establish this relationship as already indicated. Whilst the mating sound will typically be a tone combination, it could take a more complicated form such as a spoken word; in this latter case, the speech recognisers of the receiving devices can be used to recognise the mating sound word and relate it to the mating signal (for example by general time of arrival). The mating signal, as well as potentially being used to carry mating sound characteristics, passes initiator-device contact data (address or other unique identifier) for enabling the other devices to communicate with it using their radio transceivers 24. A group identifier, generated by the initiator device, can also be included in the mating signal.

Once group membership has been established, the devices take it in turn to simultaneously send their mating call and mating signal again. This time the mating signal is used as a timing mark against which the other devices can determine the time of travel of the mating call from the emitting device (it being assumed that the mating signal arrives effectively instantaneously at all devices). This enables each device to determine its distance from the emitting devices. By repeating this exercise for all devices in turn and by having the devices exchange their distance data, it becomes possible for the block 57 of each device to calculate the relative positions of all devices in the group.

A state machine for the initiator device has not been illustrated as the initiator role is more readily described in flow chart terms and an appropriate state machine can be readily derived by persons skilled in the art. However, as depicted in FIG. 4, the initiator device starts off, like all the devices, in an "Ungrouped" state 51 and is then triggered by its random timeout into initiator-role related states on its way to a "Group Master" state 54 which it enters upon the group membership becoming settled (see arrow 60). The further states 52, 55, 56 and 57 shown in FIG. 4 concern the operation of the other devices during the group discovery process (the main state during this process being the "Grouping" state 52), whilst the remaining states 53 and 58 relate to the operation of the non-initiator group-member devices once the group membership has been settled.

In the present embodiment, it is assuming that the initiator device causes its mating sound and signal to be emitted at the same time so that the mating signal will be received by the other devices in advance of the mating sound. Upon receipt of the mating signal, a non-initiator device transits to "First Listen" state 55 (arrow 61) where it waits the receipt of a related mating sound; if the mating signal carried data about the mating sound characteristics, this is extracted and passed to the sound functions block 22 to enable the latter to recognise the mating sound. If the mating sound is received within a timeout period (which is either of fixed duration or set in accordance with time-relationship data carried by the mating signal), then the device transits to the Grouping state 52 and sends an acknowledgement signal back to the initiator device using its radio transceiver 24 (see arrow 62 in FIG. 4). However, if no mating signal is received before expiration of the timeout, the device sends a restart appeal signal to the initiator asking the initiator device to resend the mating sound and signal (this is not unreasonable since the use of the short-range radio transceivers to send the mating signal means that the initiator device nearby and failure to pick up the mating sound could have been caused by extraneous noise). Both the acknowledgement signals and the restart appeal signals include details of device identity, type and contact data.

The initiator device receives the acknowledgements and any restart appeals (step 42 in FIG. 3). If there are any restart appeals, the initiator device then considers these appeals and communicates its decision to all devices that have sent it either an acknowledgement or a restart appeal (step 43). By way of example, the initiator device may be arranged to grant restart appeals if there is more than one such appeal and there have been no previous restarts, but to deny a single appeal or appeals following a restart. If a restart appeal is granted, all non-initiator devices are brought back to their Ungrouped state by the communication sent by the initiator device (see arrows 64 and 65 in FIG. 4) and the mating sound and signal are resent (this is not explicitly shown in FIG. 3). If a restart appeal is refused, the appealing device(s) are returned to their Ungrouped state (arrow 64) and take no further part in the grouping process, whilst the devices already in the Grouping state are left undisturbed.

After any appeals have been handled and any restart carried out, there will generally be one or more devices residing in the Grouping state, the identity of these devices being known to the initiator device. If there are no devices in the Grouping state, the initiator device will, of course, give up its attempt to form a group and returns to the Ungrouped state.

Assuming there are devices in the Grouping state at the end of step 43, the initiator device next proceeds to set the initial group membership and to rank the members of the group (step 44). The initiator device can decide not to exclude some of the devices from the group—for example, the initiator device may have been programmed only to include devices of a certain type in any group which it forms.

The ranking of devices can also be done on the basis of their type; alternatively, order of reply to the mating sound can be used to set rank (this will generally correspond to a ranking based on distance from the initiator device). The initiator device next sends the initial group membership and ranking to the devices that are in their Grouping state (step 45), causing excluded devices to return to the Ungrouped state (arrow 71 in FIG. 4); in fact, for the present embodiment, this step 45 is not essential since there is a later transmission of a final membership list.

The next stage of the group discovery process is for each non-initiator device that is a member of the initial group, to check its sound connectivity with other such members. This is effected by each device in turn emitting a connectivity-check sound (via its sound function block and loudspeaker 17) and a related connectivity-check signal (via its radio transceiver 24). The regulation of this process is done, in the present embodiment, by trigger signals sent by the initiator device (step 46, FIG. 3); it is also possible, however, to arrange for the devices to be self regulating as regards when they send out connectivity check sounds and signals, particularly in the case where they already know the initial group composition and their ranking in the group.

In the present embodiment, the initiator device first triggers the highest-ranked non-initiator member to send its connectivity-check sound and signal (arrow 66, FIG. 4). The connectivity-check sound and signal whilst preferably different from the mating sound and signal, can be related one to the other in much the same way as for the mating sound and signal. Similarly, the mating signal will include at least the identity of the sending device.

Upon a non-triggered member device receiving a connectivity-check signal from another device, it enters a "Second Listen" state 57 (arrow 67) and waits to receive the related connectivity-check sound. If the connectivity-check sound is received before the expiration of a timeout, the receiving device returns to its Grouping state 52. However, if the connectivity-check sound is not received before expiration of the timeout, then a retry appeal signal is sent by the device, via its transceiver 24, back to the initiator device (arrow 69). The initiator device is then responsible for deciding (step 47, FIG. 3) whether or not to re-trigger the device that has just sent its connectivity-check sound and signal (not illustrated in FIG. 3) or whether to proceed with triggering the next member device. In this latter case, the initiator device notes that the appealing device cannot hear the last-triggered member device.

As an alternative to each device sending a connectivity-check signal along with its connectivity-check sound, it is possible to use the trigger signals sent by the initiator device to indicate to the non-triggered devices that a particular device is about to send a connectivity sound. This, of course, requires the trigger signals to be sent for receipt by all the member devices, notwithstanding that only one device is designated in the signal for sending a connectivity-check sound. However, not having the devices send connectivity-check signals with their connectivity-checks sounds removes the possibility of each device specifying, in the connectivity-check signal, particular characteristics for its connectivity-check sounds.

Once all the member devices, other than the initiator device itself, have been triggered to send their connectivity-check sound (tested for in step 48, FIG. 3), the initiator device derives the final (or "settled") group list taking account of the gaps in sound connectivity that have been reported in the form of the retry appeal signals. The initiator device uses a predetermined policy to decide whether to include or exclude devices that do not have full sound connectivity to all other group members. The final group list is then sent by the initiator device via its radio transceiver 24 to the devices that were initial group members. Devices that are not in the final list transit back to the Ungrouped state 65 (arrow 650 whilst those in the final list transit to the Grouped state. As for the initiator device, after effecting step 49, it resides in the Group Master state 54 (in fact, it is not essential that the initiator device takes this state and any other one member could be designated by the initiator device, or otherwise selected, to take up the Group Master state with the initiator device moving to the Grouped state).

In the foregoing, sound connectivity data concerning a particular device was sent back to the initiator device simply as retry appeals with absence of such an appeal being taken as an indication that sound connectivity existed between the most recently triggered device and the non-appealing devices. In other embodiments, the sound connectivity of a device to the other members can be arranged to be reported back to the initiator device only when present or both when present and when absent, this reporting being done either following each device being triggered or once all devices have been triggered.

Since a group member, whether the initiator device or another device, may cease functioning or be removed from the space 11, provision is made for the member devices to periodically check the presence of all members, this being most simply done by a communications check over the short-range radio transceivers. Thus, as illustrated in FIG. 4, each member device which is not in the Group Master state, periodically sends a contact signal to the device that is in that state (arrow 72), the sending device thereupon moving to a "Check" state 58. If the communication check is passed as indicated by the receipt back of an acknowledgement signal sent by the device in the Group Master state (arrow 75), the device in the Check state reverts to the Grouped state 53. However, if no acknowledgement is received before expiration of a timeout, then it is assumed (possibly after a retry) that the device in the Group master state has failed or been moved and the sending device informs other group members that the device formerly occupying that state is no longer a group member 9 and moves to the Group Master state (arrow 74); alternatively, another device such as the highest-ranked device moves to the Group Master state. Conversely, if a device in the Grouped state does not send a contact signal to the device in the Group master state within a specified time, the latter device removes the former device from the member list and informs the other devices (arrow 76).

It may be noted that the foregoing presence check is done using the transceivers rather than by checking continued sound connectivity. It is, of course, possible to carry out presence checks using sounds in much the same way as the connectivity-check sounds were used.

As well as serving as a central point for presence checking, the device in the Group Master role can also be used to invite new members into the group. This is done by arranging for only the device in the Group Master state, amongst the group members, being operative to respond to a mating sound and signal received from a non-member device; the Group Master device responds, for example, by sending a conditional invitation to join, the new device being required to establish its sound connectivity to the other group members before membership is confirmed.

The Group Master device can also be made responsible for disbanding the group, though any member should be permitted to leave gracefully at any time. Furthermore, the Group Master is preferably arranged to re-start the set-up phase either as a result of user input or after expiration of a group-life period; in this case, each device receiving the new mating signal automatically ends its association with the group having the mating-signal-emitting device as Group Master. Additionally or alternatively, all devices can be reset into their Ungrouped state by a command signal sent from a user-operated control unit linked by radio with transceivers 24.

It is possible to arrange for each device to be a member of two or more groups at the same time in which case each device effectively creates a respective state machine instance for each group of which it is, or is seeking to become, a member. To avoid confusion, the mating signals of initiator devices carry a group identifier which is then included by every actual or potential member devices in all signals they send via their transceivers 24.

Many other variants are possible to the above-described group discovery method. Thus, for example, the role of the initiator device in controlling the operation of the other devices can be reduced by enabling these other devices to act in a more autonomous manner. This, of course, requires that the latter devices all have adequate information available and act in a consistent manner. The non-initiator devices can, for example, be arranged to determine for themselves initial and/or final group membership by ensuring that:

all devices receive the same information as the initiator device did in the above-described method (i.e. the acknowledgement and/or retry-appeal signals represented by arrows 62 and 69 in FIG. 4), and all devices operate the same selection policy where some potential group member devices are excluded.

Similarly, the devices can be arranged to individually determine the device rankings and to send their connectivity-check sounds and signals without external triggering in accordance with their rank.

The initiator device need not be included as a member of the group though, of course, generally it will be.

The group discovery method can be simplified by omitting the restart and retry appeals. Indeed, the sound connectivity checks can be omitted entirely with group membership then being determined solely on the basis of what devices can receive both the initiator mating sound and signal.

It is also possible to operate on the basis that each member device (including even the initiator device) only knows that it is a member of a specific group without knowing who the other group members are (thus, whilst each device individually discovers its own membership of the group, the overall group membership is not explicitly discovered). In this variant, the devices receiving both the mating sound and signal do not send acknowledgement signals but simply note that they belong to a group the identity of which is given in the received mating signal. For a group determined in this manner, it is not possible to determine ranking directly and this grouping method is only useful in limited situations. However, if the group members were arranged to implement the sound connectivity check described above, this would enable each device to ascertain the identity of each other group member; it may be noted that since no ranking has been previously established, two or more devices may emit their connectivity-check sounds and signals at the same time and appropriate measures will need to be taken to deal with this eventuality (for example, different frequency sounds could be used for different devices, or a collision detect and random back-off method could be used as in the IEEE 802.3 network protocol).

Although in the foregoing all devices are described as having the same group discovery functionality, it would be possible to provide the initiator device functionality in one device only and the non-initiator device functionality in all other devices; such an arrangement is not, however, preferred.

Device Location Discovery

As already outlined above, the devices 14, as the second part of their set-up phase, carry out a location discovery process in which the devices determine their relative locations. This location discovery is effected using corresponding functionality of the control block 23 in conjunction with the sound functions block 22, the microphone 16, the loudspeaker 21 and transceiver 24. In general terms, location discovery is effected by measuring the distance between the devices by determining, for each device in turn, how long it takes a sound emitted by the sound functions block 22 and loudspeaker 21 of that device to reach the other two devices.

Figure 5:
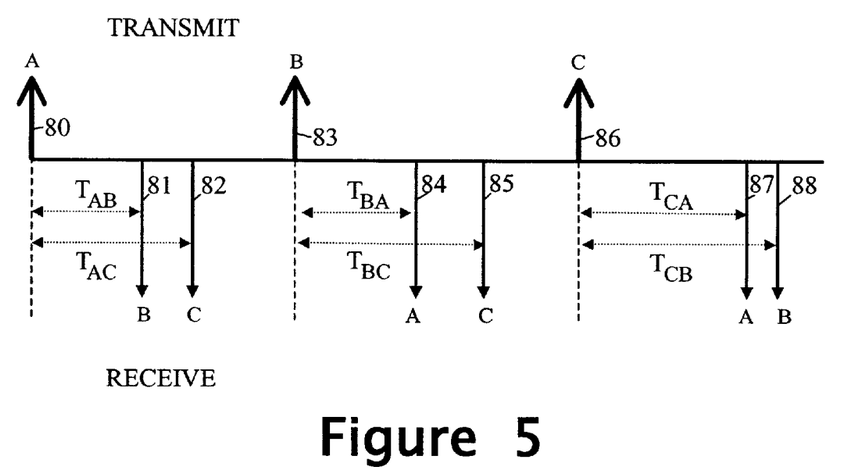
FIG. 5 is a diagram illustrating the timing measurements made during a device location discovery process cared out by the FIG. 1 devices.

Thus, as illustrated in FIG. 5, devices A, B and C emit in turn a test sound (with a sharp attack) at respective times represented by arrows 80, 83 and 86. The test sound emitted by device A is received by devices B and C at respective times represented by arrows 81 and 82, the transit time to device B being designated $T_{AB}$ and to device C, $T_{AC}$. Similarly, the test sound emitted by device B is received by devices A and C at respective times represented by arrows 84 and 85, the transit time to device A being designated $T_{BA}$ and to device C, $T_{BC}$. Finally, the test sound emitted by device C is received by devices A and C at respective times represented by arrows 87 and 88, the transit time to device A being designated $T_{CA}$ and to device B, $T_{CB}$. Of course, the transit times $T_{AB}$ and $T_{BA}$ should be the same; similarly $T_{AC}$ and $T_{CA}$ should be equal as should $T_{BC}$ and $T_{CB}$.

It will be appreciated that in order to measure the transit times, a common time reference must be used for the time of emission and time of receipt. In this respect, internal clocks provided in the control blocks 23 of the devices are unlikely to be synchronised unless special measures have been taken to achieve this. However, since the distance between the devices is small, it is acceptable to assume that a timing reference signal sent by the test-sound emitting device over its short-range wireless transceiver 24 will be instantaneously received by the other devices. Therefore, by arranging for each device 14 to send a timing reference signal via its transceiver 24 at precisely the same time as it emits its test sound, measurement of sound transit time to each of the other devices can be achieved simply by measuring, at each receiving device, the interval between the time of receipt of the timing reference signal and the test sound (it being assumed that the processing time in the sending and receiving devices is the same for the timing reference signal as for the test sound—if this is not the case, the discrepancy is likely to be fairly constant and can be compensated for in the receiving device).

In fact, the timing reference signal does not need to be sent at the same time as the test sound. For example, it could be sent one second in advance or in arrears, the size of this time offset either being predetermined or specified in the timing reference signal. A further alternative is to have the devices determine their relative clock offsets one to another by using time-stamped signals exchanged between the devices over the short-range radio links. However, the preferred implementation is to have the sending device transmit its timing reference signal and test sound at the same time as described above.

Figure 6:
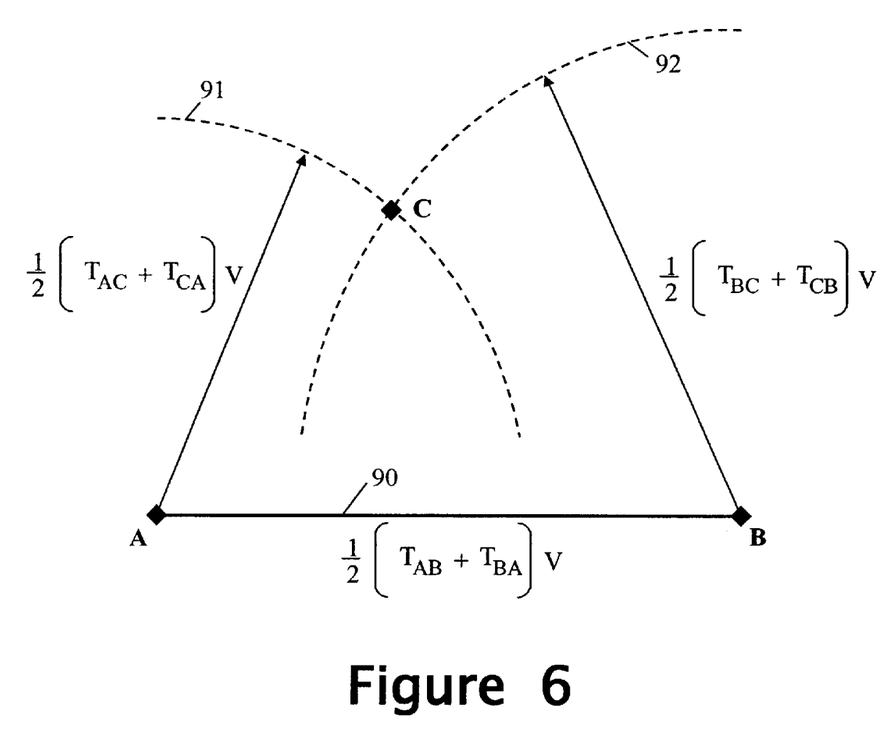
FIG. 6 is a diagram illustrating the derivation of relative device location using the FIG. 5 timing measurements.

The measured transit times (adjusted by removing any predetermined processing time element) are converted into inter-device distances using the local velocity of sound "v". These inter-device distances are then used to determine the relative locations of the devices by a process that is graphically illustrated in FIG. 6 (the actual determination is done by computational calculation in a manner that will be readily appreciated by persons skilled in the art.). More particularly, points A and B representing devices A and B are placed on a base line 90 at a distance apart corresponding to:

$$\tfrac{1}{2}(T_{AB}+T_{BA})v$$

that is, the average of the two measurements between devices A and B. Point C is then located at the point of intersection of a circle 91, centred on point A, of radius:

$$\tfrac{1}{2}(T_{AC}+T_{CA})v$$

and a circle 92, centred on point B, of radius:

$$\tfrac{1}{2}(T_{BC}+T_{CB})v$$

The foregoing determination of the relative device locations can be done by all devices independently or by a specific one of the devices (such as the Group Master device). Of course, in order to derive the relative device locations, the or each device carrying out this task needs to receive transit time information from the other devices and this is done using the transceivers 24. The transceivers 24 are also used to distribute the derived relative locations where these are determined by only one device (in fact, it may not be required that all devices know these relative locations and in this case, distribution is accordingly curtailed or not performed at all).

Whilst the location derivation can be simplified by using transit times in only one direction between each device pair (with a consequent reduction in the amount of information needing to be passed to the or each device effecting location determination), this is not preferred.

Furthermore, whilst location derivation has been described above for three devices, it will appreciated that the method can equally be applied to more devices. In this case, locating the fourth and subsequent devices can be done using three or more distance circles, one from each already-located devices—this can lead to the location of the device whose location is currently being derived, being defined by an area bounded by arcs of the distance circles (the circles having failed to intersect at a single common point). Where this happens, the location of the device concerned is taken to be, for example, the average of the minimum and maximum x and y coordinates, or as the centre of gravity of the bounded area. However, measurements which show significant discrepancies relative to the other measurements should be discarded as erroneous; such a situation can arise where a test sound reaches a device only by an indirect path involving reflections off surfaces (in this case, the transit time is not a measure of the straight line distance between emitting and receiving devices).

The above description given with reference to FIG. 6 as to how the relative locations of devices are determined assumes that the devices all lie in the same plane; if this is not the case, then spherical geometry needs to be applied to determine the relative locations of the devices and the minimum number of devices required increases to four. However, in practice devices will generally be sited at approximately the same height (roughly at desk height) and for most applications it is acceptable to treat them as being located in the same plane.

It will be recognised that the sending out of test sounds and timing reference signals by each device is very similar to what occurs during the group discovery process described above (where the initiator device emits a mating sound and signal and the other initial group members each subsequently emits a connectivity-check sound and signal). Indeed, it is possible to arrange for the sound-signal pairs emitted during the group discovery process also to serve as the sound-signal pairs required by the location discovery process. In this case, the devices preferably defer the transmission of transit time measurements until after group membership has been finalised. One potential drawback of using the group-discovery emissions also for location discovery is that it may be desired to repeat the location discovery process without repeating group discovery. Of course, this possibility can be handled by providing the devices with the capability of carrying out location discovery by sending out test sounds and timing reference signals independently of the group-discovery emissions, but arranging for the devices to effect initial location discovery when a group is first being set up by using the sounds and signal emitted during group discovery. Subsequent repeat of location discovery (triggered, for example, by expiration of a timeout period, by user command, or by a device sensing that it has been moved) is effected using the independent location discovery functionality.

Post set-up phase location discovery may be required only in respect of one device as would be the case if only one device has been moved. In this case, the device that has been moved is arranged to indicate to the other devices (such as by a message passed using transceivers 24) that its location needs to be determined again, the device then proceeding to emit a test sound and timing reference signal to enable the other devices to re-measure their distance from the emitting device. The aforesaid indication that a single device location is to be re-determined can be including in the timing-reference signal sent by the device concerned. The measured transit times to the non-emitting devices are then passed to the or each device effecting the location re-determination; after the new location has been derived, it replaces the former location of the device concerned held by the other devices. It may be noted that in the procedure just described, the transit time from the subject device to each of the other devices is only measured in one direction; it is, of course, possible to have each other device also emit a test sound and timing reference signal to enable the return transit time to be measured and used in location determination (where this is done, re-calculation of the location of all devices can also be done with little extra overhead).

The capability to determine the location of a single device subsequent to the location discovery process carried out in the set-up phase, can also be used to enable the devices to determine the location of a device that is not a member of the same group as the other devices. In particular, a hand-held feature-mapping device 100 (see FIG. 7) can be provided that incorporates the elements 110 of the described location-discovery functionality that are required for:

(a)—emitting a test sound and timing reference signal (b)—receiving back transit-time information and the relative locations of the existing devices (unless such relative locations are already known to the feature-mapping device), and (c)—determining its location from the returned information and storing this information.

Elements (b) and (c) need not be provided in the feature-mapping device where the other devices 14 are used to effect the determination of the location of the feature-mapping device; in this latter case, the determined location of the feature-mapping device and the relative locations of the other devices (or a location reference related to the locations of the other devices) are preferably sent via the communications subsystem to the feature-mapping device.

As illustrated, the feature-mapping device 100 is provided with a trigger button 101 for initiating the location determination process. The sound emitter (loudspeaker) of the device 102 is located on the end of a short stalk 103 enabling it to be positioned where desired, such as in the corners of a room 11.

Preferably, the feature-mapping device 100 also has an input arrangement enabling a user to input an identity label for a space (room) feature whose location is being established using the feature-mapping device. This label can take the form of a text label selected using, for example, a scroll-down display 105, or a verbal label verbally input by the user via microphone 106. The label is stored with the corresponding location information for the feature concerned. Using the feature mapping device, it therefore becomes possible to collect location information about a desired set of room features (such as doors, windows, corners) which can subsequently be used to derive a map of the space 11 (with or without indications of the locations of the group member devices 14 used to determine the feature location information). Knowing the location of features such as the room door may also be required for other functionality of the group member devices 14 as will illustrated below in respect of an implementation of the device announcement method.

Another application of the capability for cooperating in the determination of the location of a non-member device, is in respect of discovering the location of particular equipment. Thus, if the equipment is provided with the elements needed to participate in the location determination process described above, and assuming that the equipment can be remotely triggered to initiate the location-determination process (for example, via its short-range transceiver or via a network connection), then the equipment location relative to the group can be measured and returned to the party triggering the location determination. This is most useful if the absolute location of the group is also known and communicated (this information may, for example, be kept in a database that can be accessed by group identity, the latter having been returned with the equipment's relative location).

Finally, it may be noted that provided there are at least three cooperating devices that have established their relative locations using the above-described process involving test sounds and timing references signals, the relative location of a further device (such as the feature-mapping device) can be done simply by having this further device send a test sound, there being no need also for it to transmit a timing reference signal. This is possible assuming that the times of receipt of the test sound at the other devices are accurately correlated, for example, either by the determination of the relative clock offsets between devices as already mentioned, or by having the device first to receive the test sound immediately send out a timing reference signal over its transceiver 24 to the other devices. Knowing the difference between the times of receipt of the test sound at the various devices, enables a location determination process to be carried out which effectively emulates the sending out a sound wave front from each device, at timings reversed from the test-sound receipt times, in order to determine a point where the wave fronts from all devices simultaneously coincide, this point being taken as the location of the test sound source. A fuller description of location determination effected in this manner can be found in our aforesaid UK Application No. GB 0030918.7. it will be appreciated that this location determination method can also be used to derive the location of a human user emitting a sound (for example, a hand clap) treated as a test sound (and, indeed, also as a trigger signal triggering the devices to effect location determination by this process).

Announcing the Devices

As already indicated, when the group member devices are in their operational mode, one role that the devices can usefully perform is the announcement to a user of their existence upon an appropriate trigger being generated, such as a user clapping their hands or a door sensor emitting a signal (e.g. via a short range transmitter) upon a user entering the space 11. For this role, the device announce subsystem 26 of each device 14 is provided with a trigger detection unit 27 (depicted in FIG. 1 as a clap detection unit 27 by way of example), an announce control block 28, and an announcement output generator 29 for producing, via loudspeaker 21, an audible device description. Preferably, the devices of a group are arranged such that either all of them announce themselves in turn in response to prompt trigger being detected, or none of them do. This can be achieved for example, by arranging for one device, such as the Group Master device, being the sole judge of whether an announce trigger has been received in which case, this device is responsible for communicating the trigger event to the other devices either directly or by commanding them to make their announcements. Alternatively, whenever any device detects an announce trigger it can inform the Group Master device which then determines, on the basis of how many devices consider a trigger to have been received, whether the devices should announce themselves (this determination could also be made by each device autonomously provided all devices are provided with the needed information and all operate the same decision rules).

For the purposes of the present description, it will be assumed that the Group Master device determines whether or not an announce trigger has been received based solely on its own observations, this device then commanding the other devices (via transceiver 24) to make their respective individual announcements as and when required to achieve a desired order of announcement (as determined by the Group master device). It is to be understood however, that autonomous operation of the devices is also possible subject to the conditions mentioned above.

In order to help the user appreciate what devices are present in the space 11, an ordering of device announcements is chosen such that, so far as the user is concerned, the progression between announcing devices proceeds either entirely in a clockwise sense or entirely in an anticlockwise sense. This helps the user visually locate the devices in the space 11. Visual location can be further facilitated by having each device flash a light source, such as an LED, mounted on the device whilst the device is announcing.

In determining the order of announcement, the Group Master device bases itself on a user position that is arrived at in one of the following ways:

(i)—The user's position is assumed to be at a particular device-relative location such as an entrance to space 11 or the centre of space 11 both of which locations can be previously determined (for example, using the above-described feature-mapping device) and stored in the memory of the Group Master device. Using an assumed location for the user's position can be employed as a default where an announce prompt is detected but user position is not available according to the methods of (ii) and (iii) below;

(ii)—A sensor at a known device-relative location detects the presence of a user and signals this (for example, via a radio link) to the Group Master device, this signal being both an announce trigger and an indicator of location. Such an arrangement can be used to trigger device announcement upon a user entering a room, the sensed user location being at the room entrance (of course, if there is more than one entrance, the identity of the entrance should be encoded in the signal sent to the Group Master device).

(iii)—The user's position is measured in some manner—for example, by using the test-sound-only location method described above where the group member devices determine the location of a test sound generated by a human. Preferably, this test sound is a handclap that also serves as the announce trigger. Any other suitable method of determining the location of the user relative to the devices 14 can alternatively be employed.

Figure 8:
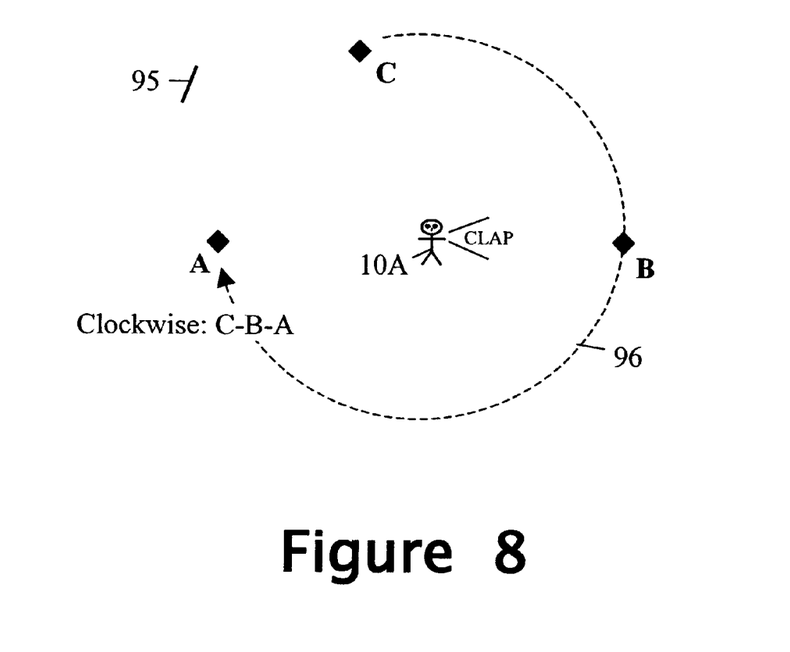
FIG. 8 is a diagram illustrating device announcement ordering relative to a fixed assumed user location.

FIG. 8 illustrates a situation where user location is arrived at according to (i) above—that is, the user is assumed to be located at entrance 95 (in fact, as depicted, the user 10A is positioned in the middle of the devices). Upon the user triggering device announcement by clapping, the Group Master device determines that the devices should announce in a clockwise sense relative to a user located at entrance 95. The device first to announce is, in this example, preset to be a specific device such as the Group Master device. Thus, if device C is the Group Master device, the devices announce in order C, B, A (see arrow 96). Of course, the Group Master device could equally decide to order announcements in an anticlockwise sense, that is, in order A, B, C. Because the devices may be subject to being moved within space 11, the order of announcement should be determined at each triggering even if the same assumed user position is being used as for a previous announcement sequence.

It may be noted that if device B in FIG. 8 had been chosen to be the first-to-announce device, then the announcement order (if done clockwise) would have been B, A, C which for a user actually positioned at entrance 95, takes the announcement sequence from the extreme left device (device A) to the extreme right device (device C)—that is, the announcement sequence swings round at least a fall semi-circle behind the user between devices A and C. This is not ideal and accordingly, unless some other factor dictates the choice of the first device to announce, it is preferred not to pre-specify which device should be first to announce but, instead, to arrange for the Group Master device (or other deciding device) to choose the first-announcing device such that the angle between the first-to-announce device and the last-to-announce device that is subtended at the user position used for order determination, is a minimum for the sense of announcement progression chosen.

Figure 9:
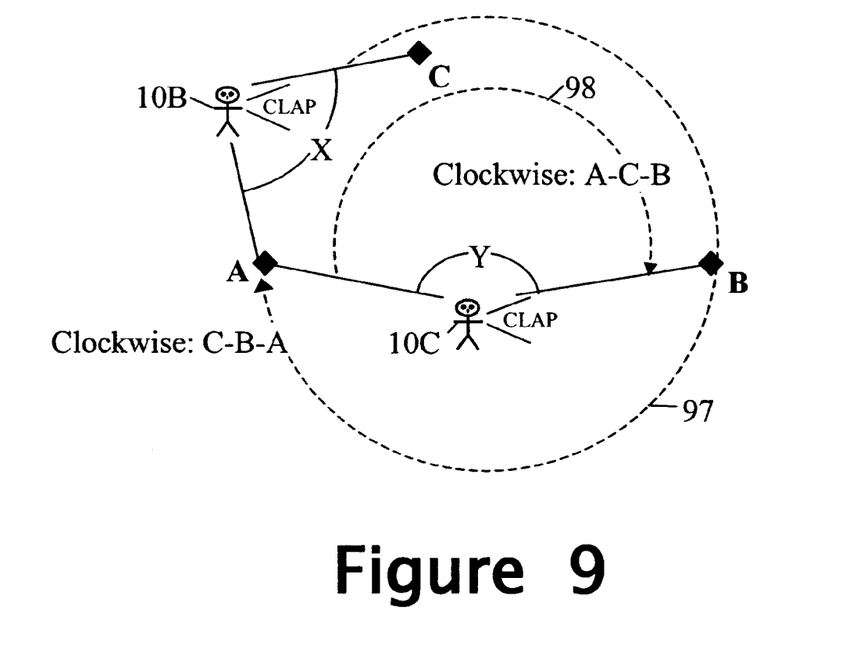
FIG. 9 is a diagram illustrating device announcement ordering taking account of user positioning.
Figure 10:
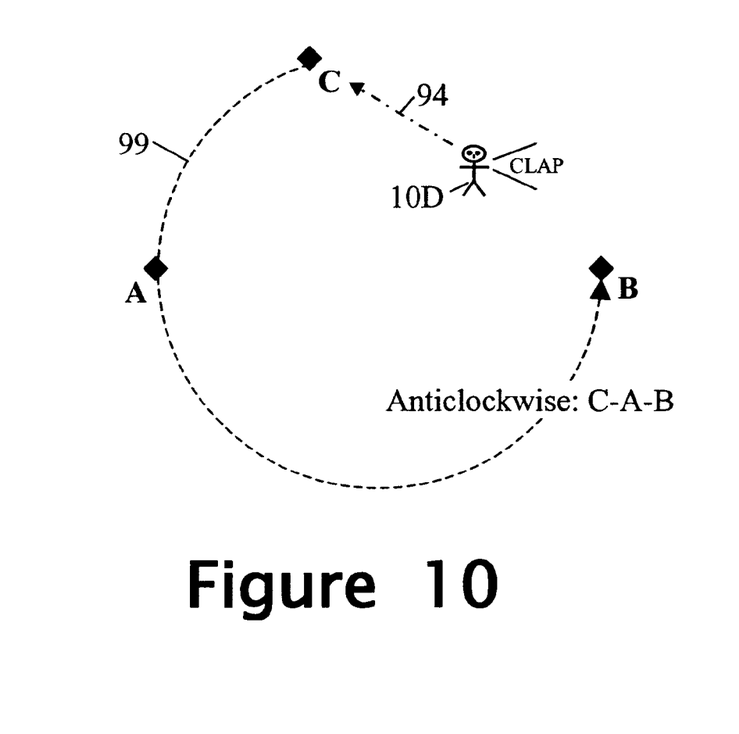
FIG. 10 is a diagram illustrating device announcement ordering taking account of the location and direction of facing of the user.

FIG. 9 illustrates the application of the foregoing policy in respect of two users 10B and 10C where the order of announcement is determined based on the user's actual position. Thus, for user 10B who is located in the entrance 95, for a clockwise progression of announcement the minimum angle X subtended at the user 10B between the first and last-to-announce devices, is achieved by starting at device C, the announcement order being C, B, A as indicated by arrow 97. In contrast, in respect of user 10C positioned just below the line of devices A and B, for a clockwise progression of announcement the minimum angle Y subtended at the user between first and last-to-announce devices, is achieved by starting at device A, the announcement order being A, C, B as indicated by arrow 98.

Where the fist-to-announce device is determined by other considerations, then the sense of progression of order announcement (clockwise or anticlockwise) is chosen such that the angle subtended at the operative user position is minimised. FIG. 10 illustrates this for a user 10D where the first-to-announce device is chosen on the basis of which device 14 the user is most nearly looking at when triggering device announcement by clapping. In the FIG. 10 example, the user is facing device C when triggering device announcement (see arrow 94) so this device is chosen to be the first to announce. Further, the sense of announcement progression is chosen to be anticlockwise for the user position shown since this gives an angle, at user 10D, between first and last announcing devices of approximately 180 degrees as opposed to a value of around 300 degrees for a clockwise progression. The selected order of announcement is therefore C, A, B. Techniques for determining which device a user is facing are described in the afore-mentioned UK patent applications; other ways for the user to indicate which device should announce first are, of course, possible such as by pressing a specific button on the device concerned to initiate device announcement, or by means of a special spoken command interpreted by the speech recognition block 17 of a device 14 and passed on to the announce control block.

It may be noted that since the duration of each announcement is preferably not predetermined, there should preferably be some way of detecting when a device has finished announcing so as to be able to have the next announcing device begin with only a small gap from the end of the preceding announcement. This can be achieved by having the controlling device (such as the Group Master device) listen for termination of announcement as indicated by a period of silence. A more reliable approach is to arrange for the announcing device to send a signal via its transceiver 24 immediately it finishes its announcement.

Other variants are also possible to the announcement arrangement described above. For example, the order of announcement can be determined by the Group Master device and passed to all the other devices prior to the commencement of announcements, each device then determining when it is its turn to announce and announcing accordingly.

The above-described techniques for controlling announcement order can equally be used for controlling the order of presentation of other forms of human discernible output, such as visual output.

Many other variants are, of course, possible to the devices described above with reference to FIGS. 1 to 10. Thus, whilst short-range radio technology (in transceiver 24) has been described for inter-communicating the devices by a non-sound channel, other forms of electromagnetic communication channel can alternatively be used such as infrared transceivers and even a wired network (using, for example, coax cable, fiber-optic cable or UTP wiring cable all of which rely on electromagnetism for their operation). It will also be appreciated that the sounds emitted by the devices can be within or outside the range of human audible sounds.

What is claimed is:

1. A location discovery method for a plurality of devices equipped with respective electromagnetic communication subsystems, sound emitters and sound receivers; the method comprising the steps of:

a) emitting from each device both a test sound and, via its communications subsystem, a timing-reference signal;

b) receiving the test sound and timing-reference signal emitted by each device at at least two other said devices and determining respective measures of the transit times of the test sound between emitting and receiving devices, the timing-reference signal enabling the timing of emission of the test sound to be related to the timing of its receipt; and c) using the transit-time measures to determine the relative locations of the devices.

2. A method according to claim 1, wherein each device sends its test sound and timing-reference signal at the same time, each receiving device determining said measure of the test-sound transit time as the interval between receipt of the timing-reference signal and the test sound.

3. A method according to claim 1, wherein each device sends its test sound and timing-reference signal separated by a time interval, this time interval being either predetermined and known to all devices or being specified in the timing reference signal by the emitting device, each receiving device determining said measure of the test-sound transit time as the interval between receipt of the timing-reference signal and the test sound as adjusted to take account of said time interval.

4. A method according to claim 1, wherein the timing reference signals exchanged by the devices are used to determine clock offset values between respective clocks of the devices.

5. A method according to claim 1, wherein step (c) is carried out by having the devices send their transit-time measures to a predetermined one of the devices using their communication subsystems, said predetermined device thereupon determining the relative device locations.

6. A method according to claim 5, wherein said predetermined device sends the determined relative device locations to the other devices using its communication subsystem.

7. A method according to claim 1, wherein step (c) is carried out by having the devices send their transit time measurements to each other using their communication subsystems, the devices thereupon each determining the relative device locations.

8. A method according to claim 1, wherein a respective said transit-time measure is determined for each direction between pairs of devices and averaged for use in determining device location.

9. A method according to claim 1, wherein measures are determined for test-sound transit times from each device to all other said devices and used in determining device locations.

10. A method according to claim 1, wherein following an initial determination of device location, a limited new determination is carried out in respect of an entity that is either one of the devices that participated in said initial determination or a new device, the new determination involving said entity sending a test sound and timing-reference signal, and at least some of the other devices determining measures of the test-sound transit times, these new transit time measures then being used to determine the current location of said entity relative to the other devices.

11. A method according to claim 10, wherein said entity is a hand-portable device including a trigger control for initiating said new determination, operation of the trigger control sending a signal via the communication subsystem to indicate to the other devices that a new determination is to be effected.

12. A method according to claim 10, wherein the transit-times measures for the new determination, are sent to said entity which then determines its location and stores this newly-determined location.

13. A method according to claim 12, wherein a label is stored along with the newly-determined location.

14. A mapping method for mapping features of a space, the method being carried out in accordance with claim 10 with a set of devices having been positioned about the space and said initial determination of the device locations effected, said entity then being successively moved to features of the space and its location at each feature being derived by said limited new determination.

15. An asset location method for finding an asset in a space, the method being carried out in accordance with claim 10 with a set of devices having been positioned about a space and said initial determination of the device locations effected; said entity, constituting an asset to be found, thereafter being triggered to initiate a said limited new determination, the newly-determined location of the asset then being output.

16. A method according to claim 1, wherein a group discovery process is carried out to determine a group of devices to constitute said plurality of devices whose location is to be discovered, the group discovery process involving:

one said device, herein the initiator device, emitting a mating sound, via its sound emitter, in coordination with sending a mating signal via its communications subsystem, and any other device receiving the mating signal via its communications subsystem seeking to relate it with a sound, corresponding to the mating sound, picked up by its sound receiver, said other device receiving both the mating signal and related mating sound, herein an initial receiving device, thereby becoming at least a potential group member.

17. A method according to claim 16, wherein as part of the group discovery process, each initial receiving device subsequently emits a connectivity-check sound and, via its communication subsystem, a related connectivity-check signal whereby to enable each group member to determine its sound connectivity to other members of the group.

18. A method according to claim 17, wherein location determination is effected in parallel with the group discovery process, said mating and connectivity-check sounds serving as the test sounds and said mating and connectivity-check signals serving as said timing-reference signals.

19. A method according to claim 1, wherein said devices are stand-alone devices.

20. A method according to claim 1, wherein said communications subsystem is one of an infrared communications subsystem, a short-range radio subsystem, and a cabled network subsystem.

21. A device comprising:

a sound emitter for emitting a test sound;

a sound receiver for receiving a test sound;

an electromagnetic communications subsystem for sending and receiving timing-reference signals;

an emission control arrangement for sending a test sound via the sound emitter and a related timing-reference signal via the communications subsystem;

a measurement arrangement operative upon the receipt of a test sound and related timing-reference signal from another device to determine a measure of the transit time of that test sound and thereby of the distance between the two devices; and a distribution arrangement for sending the determined measure to at least one other device via the communications subsystem.

22. A device according to claim 21, further comprising a location-determination arrangement for receiving, via said communications subsystem, further test-sound transit-time measures that have been determined by other devices, and for using these further measures and the measure determined by its own measurement arrangement to determine the relative locations of the devices.

23. A device according to claim 22, wherein the location-determination arrangement is operative to average transit-time measures it receives that relate to test sound passed in opposite directions between the same pair of devices.

24. A device according to claim 22, further comprising group-discovery means operative to use the emitted and received test sound and timing-reference signals to determine membership of a group of devices, including itself, having sound connectivity with each other.

25. A device according to claim 22, further comprising entity locating means for assisting in determining the location of an entity from which it has received a test sound and timing-reference signal, the entity locating means being operative to return to that entity, via the communications subsystem of the device, both the relative locations of the devices and a measure, determined by the measurement arrangement of the device, of the transit-time of the test sound received from the entity.

26. A device according to claim 22, further comprising entity locating means for assisting in determining the location of an entity from which the device has received a test sound and timing-reference signal, the single-entity locating means comprising:
means for determining the location of the entity relative to said devices using measures, determined by the measurement arrangement of the device and other devices, of the transit time of the test sound emitted by the entity, and
means for returning to that entity, via the communications subsystem of the device, the location of the entity relative to a device-related reference.

27. A device according to claim 21, further comprising a location-data arrangement for receiving, via said communications subsystem, the relative locations of the devices as determined by said at least one other device.

28. A device according to claim 27, further comprising entity locating means for assisting in determining the location of an entity from which it has received a test sound and timing-reference signal, the entity locating means being operative to return to that entity, via the communications subsystem of the device, both the relative locations of the devices and a measure, determined by the measurement arrangement of the device, of the transit-time of the test sound received from the entity.

29. A device according to claim 27, further comprising entity locating means for assisting in determining the location of an entity from which the device has received a test sound and timing-reference signal, the single-entity locating means comprising:
means for determining the location of the entity relative to said devices using measures, determined by the measurement arrangement of the device and other devices, of the transit time of the test sound emitted by the entity, and
means for returning to that entity, via the communications subsystem of the device, the location of the entity relative to a device-related reference.

30. A device according to claim 21, wherein the emission control arrangement is operative to cause the test sound and timing-reference signal to be emitted at the same time, and wherein the measurement arrangement is operative to determine said measure as the interval between receipt from another device of the timing-reference signal and test the sound.

31. A device according to claim 21, wherein the emission control arrangement is operative to cause the test sound and timing-reference signal to be emitted separated by a time interval, the measurement arrangement including means for retrieving a corresponding time interval in respect of a received test sound and related timing signal, the measurement arrangement being operative to determine said measure for this received test sound and related timing reference signal as the interval between their receipt as adjusted to take account of said corresponding time interval.

32. A device according to claim 23, wherein the device is a stand-alone device.

33. A device according to claim 23, wherein said communications subsystem is one of an infrared communications subsystem, a short-range radio subsystem, and a cabled network subsystem.

34. A device comprising:
a sound emitter for emitting a test sound;
a sound receiver for receiving a test sound;
an electromagnetic communications subsystem for sending and receiving timing-reference signals;
an emission control arrangement for sending a test sound via the sound emitter and a related timing-reference signal via the communications subsystem;
a measurement arrangement operative upon the receipt of a test sound and timing-reference signal from another device to determine a measure of the transit time of that test signal and thereby of the distance between the two devices; and
a location-determination arrangement for receiving, via said communications subsystem, further measures that have been determined by other devices, and using these further measures and the measure determined by its own measurement arrangement to determine the relative locations of the devices.

35. A device according to claim 34, wherein the emission control arrangement is operative to cause the test sound and timing-reference signal to be emitted at the same time, and wherein the measurement arrangement is operative to determine said measure as the interval between receipt from another device of the said timing-reference signal and the test sound.

36. A device according to claim 34, wherein the emission control arrangement is operative to cause the test sound and timing-reference signal to be emitted separated by a time interval, the measurement arrangement including means for retrieving a corresponding time interval in respect of a received test sound and related timing signal, the measurement arrangement being operative to determine said measure for this received test sound and related timing reference signal as the interval between their receipt as adjusted to take account of said corresponding time interval.

37. A device according to claim 34, wherein the location-determination arrangement is operative to average transit-time measures it receives that relate to test sound passed in opposite directions between the same pair of devices.

38. A device according to claim 34, further comprising group-discovery means operative to use the emitted and received test sound and timing-reference signals to determine membership of a group of devices, including itself, having sound connectivity with each other.

39. A device according to claim 34, further comprising entity locating means for assisting in determining the location of an entity from which it has received a test sound and timing-reference signal, the entity locating means being operative to return to that entity, via the communications subsystem of the device, both the relative locations of the devices and a measure, determined by the measurement arrangement of the device, of the transit-time of the test sound received from the entity.

40. A device according to claim 34, further comprising entity locating means for assisting in determining the location of an entity from which the device has received a test sound and timing-reference signal, the single-entity locating means comprising:

means for determining the location of the entity relative to said devices using measures, determined by the measurement arrangement of the device and other devices, of the transit time of the test sound emitted by the entity, and means for returning to that entity, via the communications subsystem of the device, the location of the entity relative to the device-related reference.

41. A device according to claim 34, wherein the device is a stand-alone device.

42. A device according to claim 34, wherein said communications subsystem is one of an infrared communications subsystem, a short-range radio subsystem, and a cabled network subsystem.

43. A handheld device comprising:

a sound emitter for emitting a test sound;

an electromagnetic communications subsystem for sending and receiving signals;

an emission control arrangement for sending a test sound via the sound emitter and a related timing-reference signal via the communications subsystem; and a location-determination arrangement for receiving, via said communications subsystem, measures of the transit time of the test sound to other devices, and data concerning the locations of those other devices relative to one another, the location-determination arrangement being operative to use the receive measures and data to determine the location of the handheld device.

* * * * *